(12) United States Patent
Zhao et al.

(10) Patent No.: US 10,071,724 B2
(45) Date of Patent: Sep. 11, 2018

(54) REGENERATIVE TORQUE LIMIT CONTROL

(71) Applicant: FORD GLOBAL TECHNOLOGIES, LLC, Dearborn, MI (US)

(72) Inventors: Yanan Zhao, Ann Arbor, MI (US); Ming Lang Kuang, Canton, MI (US); Stuart N. Ford, Farmington Hills, MI (US); Bernard D. Nefcy, Novi, MI (US); Todd McCullough, Bloomfield Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/349,355

(22) Filed: Nov. 11, 2016

(65) Prior Publication Data
US 2018/0134276 A1    May 17, 2018

(51) Int. Cl.
  *B60W 20/14*   (2016.01)
  *B60L 11/18*   (2006.01)
  *B60L 11/14*   (2006.01)
  *B60L 7/18*    (2006.01)

(52) U.S. Cl.
  CPC .............. *B60W 20/14* (2016.01); *B60L 7/18* (2013.01); *B60L 11/14* (2013.01); *B60L 11/1861* (2013.01); *B60L 2240/423* (2013.01); *B60L 2240/443* (2013.01); *B60W 2510/0208* (2013.01); *B60W 2510/0283* (2013.01); *B60W 2710/0666* (2013.01); *B60Y 2300/18125* (2013.01); *B60Y 2300/421* (2013.01); *B60Y 2400/112* (2013.01); *Y10S 903/914* (2013.01)

(58) Field of Classification Search
  CPC ............ B60W 30/18127; B60W 20/14; B60T 2270/60; B60T 2270/602; B60T 2270/603; B60T 2270/604; B60T 2270/606; B60T 2270/608; B60T 2270/611; B60T 2270/613
  See application file for complete search history.

(56) References Cited

U.S. PATENT DOCUMENTS

| | | | |
|---|---|---|---|
| 7,841,433 B2* | 11/2010 | Soliman | B60W 10/18 180/65.21 |
| 8,939,868 B2* | 1/2015 | Kumazaki | B60K 6/44 477/5 |
| 9,187,081 B2* | 11/2015 | Dai | B60W 10/196 |
| 9,246,417 B1* | 1/2016 | Connolly | H02P 3/14 |
| 9,340,199 B1* | 5/2016 | Nefcy | B60W 20/00 |
| 9,352,744 B2 | 5/2016 | Zhao et al. | |
| 2006/0142115 A1* | 6/2006 | Senda | B60W 10/02 477/6 |
| 2009/0051304 A1* | 2/2009 | Muta | B60K 6/445 318/376 |

(Continued)

*Primary Examiner* — Thomas G Black
*Assistant Examiner* — Sara J Lewandroski
(74) *Attorney, Agent, or Firm* — David B. Kelley; Brooks Kushman P.C.

(57) ABSTRACT

A vehicle includes a powertrain and at least one controller programmed to, in response to a brake request and a shaft speed associated with a speed of the vehicle achieving a starting speed that is defined by a torque of the powertrain that changes with brake demand at a given shaft speed, reduce a regenerative torque limit that constrains regenerative braking torque over a blend-out duration based on the shaft speed.

4 Claims, 5 Drawing Sheets

(56) References Cited

U.S. PATENT DOCUMENTS

| | | | | |
|---|---|---|---|---|
| 2009/0149294 | A1* | 6/2009 | Wallner | B60K 6/445 477/4 |
| 2013/0297134 | A1* | 11/2013 | Saito | B60L 7/18 701/22 |
| 2014/0375115 | A1* | 12/2014 | Ajiro | B60T 1/10 303/152 |
| 2015/0105214 | A1* | 4/2015 | Wang | B60W 10/023 477/4 |
| 2015/0203106 | A1* | 7/2015 | Zhao | B60L 7/18 701/22 |
| 2015/0251657 | A1* | 9/2015 | Johri | B60L 7/10 701/22 |
| 2015/0360691 | A1* | 12/2015 | Nefcy | B60W 30/18127 701/22 |
| 2016/0059847 | A1* | 3/2016 | Thompson | B60W 20/40 477/3 |
| 2016/0068153 | A1* | 3/2016 | Nefcy | B60K 6/387 701/22 |
| 2016/0137182 | A1* | 5/2016 | Johri | B60W 20/10 701/22 |
| 2016/0194008 | A1* | 7/2016 | Nefcy | B60W 30/18127 701/22 |
| 2017/0259670 | A1* | 9/2017 | Kuang | B60L 7/18 |

* cited by examiner

REGENERATIVE TORQUE LIMIT CONTROL

TECHNICAL FIELD

The present disclosure relates to a vehicle system and method for controlling the application of vehicle regenerative braking.

BACKGROUND

Hybrid vehicles are vehicles with two or more power sources in a drivetrain. For example and without limitation, a hybrid vehicle may be a gasoline-electric hybrid ("HEV") having an internal combustion engine and an electric motor/generator. Hybrid vehicles may use both an engine and a motor to improve fuel consumption, emission, and performance by switching between the two power sources at optimal times or using a combination of the two depending on the hybrid system and vehicle mode.

HEVs are generally classified by the division of power between sources. Both sources may operate in parallel to simultaneously provide torque to the powertrain, or they may operate in series with the first source providing the torque and the second source used to augment the first source's power reserve.

HEVs also capture and store energy when the vehicle is experiencing powertrain braking. The electric motor functions as a generator and absorbs energy generated as a result of the powertrain braking and converts the energy to electric energy which may be used to increase the state of charge of a battery. Regenerative powertrain braking may be desirable beyond recouping energy because the HEV's energy may be dissipated with minimal or no negative torque supplied by the frictional wheel brakes, thus reducing wear on the frictional wheel brakes.

During regenerative braking, driver braking torque demand may be provided solely by regenerative braking or in combination with frictional braking. The apportionment of driver braking torque demand between frictional braking torque and regenerative braking torque (i.e., negative input torque via the motor) may be balanced throughout braking events to achieve as much regeneration as possible so that the energy may later be used to propel the vehicle and thereby improve fuel economy.

Near the conclusion of a regenerative braking event as the vehicle slows to low speed or comes to a stop, the braking torque supplied by the motor may be transferred to the friction braking system to avoid a disruption in the vehicle total braking torque when the bypass clutch disengages. This transfer may happen over a period of time to ensure smooth driving and driver satisfaction. This regenerative torque "blend-out" may be coordinated with the torque converter clutch disengaging. During the blend-out procedure, a controller(s) may cause the regenerative torque to decay and simultaneously increase the resistance of the friction brakes at a countervailing rate when the vehicle decelerates to low speeds.

Some HEVs may have more than one independent control logic for coordinating blend-out. These control logics may be based on different capacities and may have different objectives. As such, the independent blend-out requests may need to be arbitrated and the motor commanded accordingly.

SUMMARY

According to one embodiment, a vehicle includes a powertrain and at least one controller programmed to, in response to a brake request and a shaft speed associated with a speed of the vehicle achieving a starting speed that is defined by a torque of the powertrain that changes with brake demand at a given shaft speed, reduce a regenerative torque limit that constrains regenerative braking torque over a blend-out duration based on the shaft speed.

According to another embodiment, a vehicle includes a powertrain having a torque converter clutch and at least one controller programmed to in response to a brake request, specify a regenerative torque limit based on a shaft speed over a blend-out duration that ends with the clutch unlocking such that a regenerative braking torque applied by a traction motor following the regenerative torque limit decreases according to a blend-out rate that is based on a desired friction brake fill-in rate.

According to another embodiment, a vehicle includes a powertrain and at least one controller programmed to, in response to a brake request, reduce a regenerative torque limit associated with a torque capacity of the powertrain according to a blend-out rate over a blend-out duration. The blend-out rate is selected based on a predicted unlock speed of the torque converter clutch and a predicted friction brake fill-in rate at which a countervailing friction braking torque increases over the blend-out duration.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
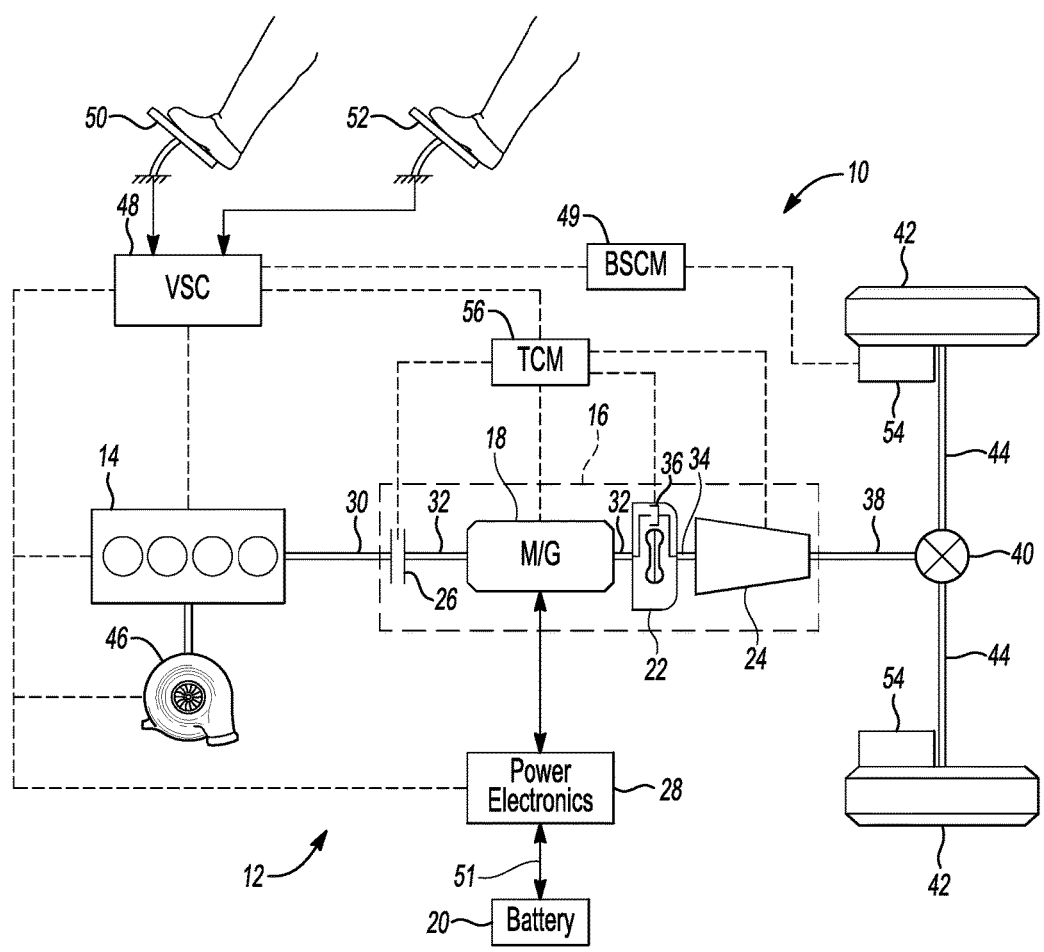
FIG. 1 is a schematic representation of a vehicle according to the present disclosure.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within HEV 10 may vary. HEV 10 may include a powertrain 12 having an engine 14 that drives a transmission 16. As will be described in further detail below, transmission 16 may include an electric machine such as an electric traction motor/generator (M/G) 18, an associated traction battery 20, a torque converter 22, and a multiple step-ratio automatic transmission or gearbox 24.

Engine 14 and M/G 18 are both capable of providing motive power for HEV 10. Engine 14 generally represents a power source which may include an internal combustion engine, such as a gasoline-, diesel-, or natural-gas-powered engine or a fuel cell. Engine 14 generates an engine power and corresponding engine torque that is supplied to M/G 18 when a disconnect clutch 26 between engine 14 and M/G 18 is at least partially engaged. M/G 18 may be implemented by any one of a plurality of types of electric machines. For example and without limitation, M/G 18 may be a permanent magnet synchronous motor. Power electronics 28 condition direct current (DC) power provided by battery 20 to the requirements of M/G 18, as will be described below. For example, power electronics may provide three phase alternating current (AC) to M/G 18.

Engine 14 may additionally be coupled to a turbocharger 46 to provide an air intake pressure increase, or "boost" to force a higher volume of air into a combustion chamber of the engine 14. Related to the increased air pressure provided to the engine 14 by the turbocharger 46, a corresponding increase in the rate of fuel combustion may be achieved. The additional air pressure boost therefore allows the engine 14 to achieve additional output power, thereby increasing engine torque.

Gearbox 24 may include gear sets (not shown) that are selectively placed in different gear ratios by selective engagement of friction elements such as clutches and brakes (not shown) to establish the desired multiple discrete or step drive ratios. The friction elements may be controllable through a shift schedule that connects and disconnects certain elements of the gear sets to control the ratio between a transmission output shaft 38 and a transmission input shaft 34. Gearbox 24 ultimately provides a powertrain output torque to output shaft 38.

As further shown in the representative embodiment of FIG. 1, output shaft 38 may be connected to a differential 40. Differential 40 may drive a pair of wheels 42 via respective axles 44 connected to differential 40. Differential 40 transmits torque allocated to each wheel 42 while permitting slight speed differences such as when HEV 10 turns a corner. Different types of differentials or similar devices may be used to distribute torque from the powertrain 12 to one or more wheels 42. In some applications, torque distribution may vary depending on the particular operating mode or condition.

HEV 10 may further include a brake system 54. Brake system 54 may comprise friction brakes suitable to selectively apply pressure by way of stationary pads attached to a rotor affixed to wheels 42. The applied pressure between the pads and rotors creates friction to resist rotation of wheels 42 and is thereby capable of slowing the speed of HEV 10.

When disconnect clutch 26 is at least partially engaged, power flow from engine 14 to M/G 18 (or vice versa) may be possible. For example and without limitation, when disconnect clutch 26 is engaged, M/G 18 may operate as a generator to convert rotational energy provided by a crankshaft 30 through an M/G shaft 32 into electrical energy to be stored in battery 20, through which HEV 10 may be decelerated. Disconnect clutch 26 may also be disengaged to decouple engine 14 from the remainder of powertrain 12 such that M/G 18 can operate as the sole drive source for HEV 10.

Operation states of powertrain 12 may be dictated by at least one controller. In at least one embodiment, there is a larger control system including several controllers. The individual controllers, or the control system, may be influenced by various other controllers throughout HEV 10, where a vehicle system controller (VSC) 48 operates at a higher hierarchy relative to other subservient controllers. VSC 48 output may directly or indirectly dictate or influence a number of vehicle functions such as starting/stopping engine 14, operating M/G 18 to provide wheel torque or recharge traction battery 20, selecting or scheduling transmission gear shifts, etc. For example and without limitation, VSC 48 may receive data from and issue commands to a transmission control module (TCM) 56 that is in direct communication with components of the transmission 16. Examples of other subservient controllers that may operate lower in a controller hierarchy compared to VSC 48 include a brake system control module (BSCM) 49, a high voltage battery energy control module (BECM), as well as other controllers that are responsible for various vehicle functions. VSC 48 may further operate to verify data received from other controllers.

Any of the above-mentioned controllers may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

VSC 48 and other controllers communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, VSC 48 may communicate signals to and/or from TCM 56 and BSCM 49. Additionally, VSC 48 may communicate with other vehicle controllers as discussed above or directly with vehicle sensor and/or components including engine 14, turbocharger 46, power electronics 28, and braking system 54. Although not explicitly illustrated, those of ordinary skill in the art will recognize various functions or components that may be controlled by VSC 48 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, torque converter clutch 36, and transmission gearbox 24, and the like. Sensors communicating input through the I/O interface may be used to indicate turbocharger boost pressure, turbocharger rotation speed, crankshaft position, engine rotational speed (RPM), wheel speeds, vehicle speed, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter clutch status, deceleration, or shift mode (for example and without limitation).

VSC 48, BSCM 49, and TCM 56 may include torque control logic features. VSC 48 is capable of interpreting driver requests based on several vehicle inputs. These inputs may include, for example and without limitation, gear selection (PRNDL), accelerator pedal inputs, brake pedal input, battery temperature, voltage, current, and battery state of charge (SOC). VSC 48 in turn may issue command signals to TCM 56 to influence the operation of M/G 18.

M/G 18 may also be in connection with torque converter 22 via shaft 32. Therefore, torque converter 22 may also connected to engine 14 when disconnect clutch 26 is at least partially engaged. Torque converter 22 may include an impeller fixed to M/G shaft 32 and a turbine fixed to a transmission input shaft 34. Torque converter 22 may provide a hydraulic coupling between shaft 32 and transmission input shaft 34. A torque converter clutch 36 may also be provided to torque converter 22 such that, when engaged, clutch 36 frictionally or mechanically couples the impeller and the turbine of torque converter 22, permitting more efficient power transfer. In other embodiments, torque converter 22 and its clutch 36 may be replaced with a launch clutch to provide vehicle launch. When clutch 36 is disengaged, M/G 18 may be mechanically decoupled from differential 40 and axles 44. For example and without limitation, during deceleration, clutch 36 may disengage at low vehicle speeds, decoupling engine 14 from transmission 16 and driveline, to allow engine 14 to idle and operate at low vehicle speeds or stop.

A driver of HEV 10 may provide input at an accelerator pedal 50 and create a demanded torque, power, or drive command to propel HEV 10. In general, depressing and releasing pedal 50 may generate an accelerator input signal that may be interpreted by VSC 48 as a demand for increased power or decreased power, respectively. Based at least upon input from pedal 50, VSC 48 may allocate torque commands between each of engine 14 and/or M/G 18 to satisfy the vehicle torque output demanded by the driver. VSC 48 may also control the timing of gear shifts within gearbox 24, as well as engagement or disengagement of disconnect clutch 26 and torque converter clutch 36. Torque converter clutch 36 can be modulated across a range between the locked and unlocked positions. This may produce a variable slip in torque converter 22 in addition to the variable slip produced by the hydrodynamic coupling between the impeller and the turbine. Alternatively, torque converter clutch 36 may be operated as either locked or unlocked without using a modulated operating mode depending on the particular application.

The driver of HEV 10 may additionally provide input at a brake pedal 52 to create a brake request. Depressing brake pedal 52 may generate a braking input signal that is interpreted by VSC 48 as a command to decelerate HEV 10. VSC 48 may in turn issue commands to cause the application of negative torque to M/G shaft 32. Additionally or in combination, VSC 48 may issue commands to activate brake system 54 to apply friction brake resistance to inhibit rotation of wheels 42. The negative torque values provided by both the powertrain 12 and the friction brakes may be allocated to vary the amount by which each satisfies the brake request.

To drive HEV 10 with engine 14, disconnect clutch 26 may be at least partially engaged to transfer at least a portion of the engine torque through disconnect clutch 26 to M/G 18, and then from M/G 18 through torque converter 22 and gearbox 24. M/G 18 may assist engine 14 by providing additional powered torque to turn M/G shaft 32. This operation mode may be referred to as a "hybrid mode." As mentioned above, VSC 48 may be further operable to issue commands to allocate a torque output of both engine 14 and M/G 18 such that the combination of both torque outputs satisfies an accelerator input from the driver.

To drive HEV 10 with M/G 18 as the sole power source, the power flow may remain the same except disconnect clutch 26 isolates engine 14 from the remainder of powertrain 12. Combustion in engine 14 may be disabled or otherwise OFF during this time in order to conserve fuel, for example. Traction battery 20 may transmit stored electrical energy through wiring 51 to power electronics 28, which may include an inverter. Power electronics 28 may convert high-voltage direct current from battery 20 into alternating current for use by M/G 18. VSC 48 may further issue commands to power electronics 28 such that M/G 18 is enabled to provide positive or negative torque to M/G shaft 32. This operation where M/G 18 is the sole motive source may be referred to as an "electric only" operation mode.

Additionally, M/G 18 may operate as a generator to convert kinetic energy from powertrain 12 into electric energy to be stored in battery 20. M/G 18 may act as a generator while engine 14 is providing the sole propulsion power for HEV 10, for example. M/G 18 may additionally act as a generator during times of regenerative braking in which rotational energy from spinning of output shaft 38 is transferred back through gearbox 24 and is converted into electrical energy for storage in battery 20.

During a regenerative braking event, M/G 18 may selectively apply a drag, or negative torque, to contribute to vehicle deceleration. Regenerative braking torque may be more efficient when torque converter clutch 36 is locked. During a locked condition, the impeller and turbine may be mechanically locked by clutch 36. This locking eliminates slip between the parts thereby improving efficiency. Keeping clutch 36 locked as long as possible during deceleration may allow the collection of more regenerative energy than would otherwise be possible with conventional torque converter scheduling. If during the deceleration, torque converter clutch 36 transitions from locked to unlocked, there may be an abrupt change in the deceleration rate, causing roughness as perceived by the driver. Therefore, such a transition may be performed gradually to enhance the smoothness of deceleration. Near the conclusion of a regenerative braking event as HEV 10 slows to low speed or comes to a stop, the braking torque supplied by M/G 18 may be transferred to braking system 54 to avoid a disruption in the vehicle total braking torque when clutch 36 unlocks. This transfer may be performed over a period of time to ensure smooth driving and driver satisfaction. According to the present disclosure, this regenerative torque "blend-out" may be coordinated with torque converter clutch 36 unlocking.

In order to achieve precise timing needed to achieve coordination, unlocking of torque converter clutch 36 may be predicted or scheduled, and the blend-out process may initiate in advance with a sufficient duration of time to achieve a smooth transition. Coordination of the regenerative torque with the deceleration needs of HEV 10 may yield smoother vehicle operation. During the blend-out procedure, VSC 48 (or any other controller alone or in combination with other controllers) may cause the regenerative torque to decay, and simultaneously increase the resistance of the friction brakes at a countervailing rate when HEV 10 decelerates to low speeds. It should be understood that the schematic illustrated in FIG. 1 is merely exemplary and is not intended to be limiting. Other configurations are contemplated that utilize selective engagement of both an engine and a motor to transmit through a transmission. For example, the motor may be offset from the crankshaft, and/or an additional motor may be provided to start the engine. Other configurations are contemplated without deviating from the scope of the present disclosure.

Figure 2A:
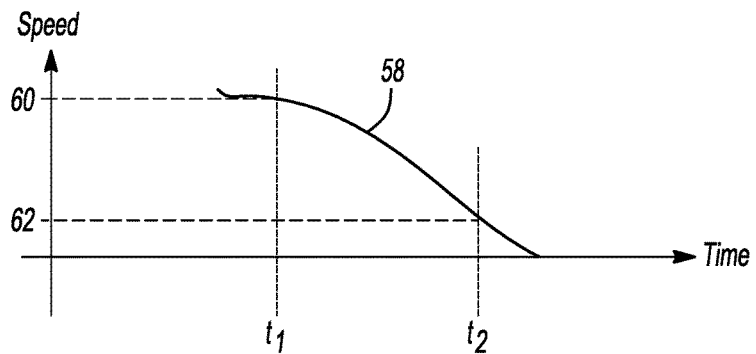
FIGS. 2A-2B are associated time plots of vehicle deceleration and regenerative braking blend-out characteristics in accordance with one control logic.
Figure 2B:
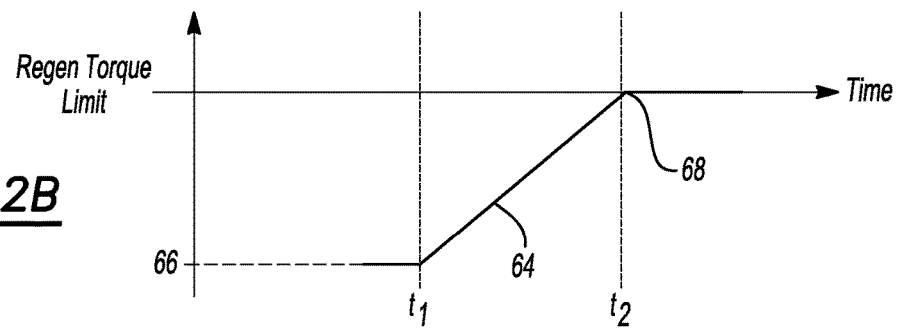
Figure 3A:
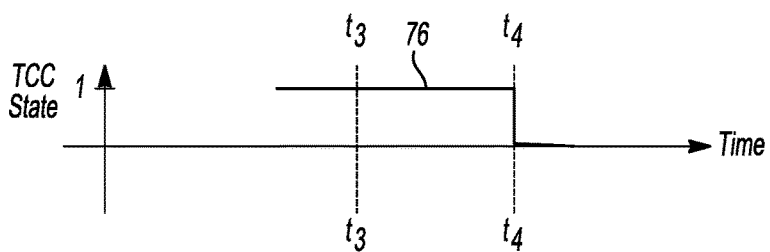
FIGS. 3A-3B are associated time plots of regenerative braking blend-out characteristics coordinated with operation of the torque converter clutch in accordance with another control logic.
Figure 3B:
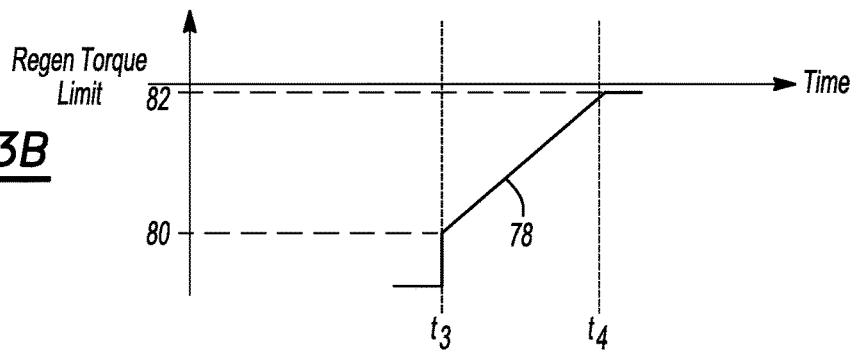

FIGS. 2A-2B are associated time plots of vehicle deceleration and regenerative braking blend-out characteristics in accordance with one control logic. FIGS. 3A-3B are associated time plots of regenerative braking blend-out characteristics coordinated with operation of the torque converter clutch 36 in accordance with another control logic. In some HEVs, there may be one or multiple control logics (i.e., algorithms) governing regenerative braking blend-out. In some embodiments, BSCM 49 and TCM 56 may each have its own independent logic and be subservient to VSC 48 (FIG. 1). For example and without limitation, BSCM 49 may be programmed to carry out the control logic illustrated in FIGS. 2A-2B, and TCM 56 may be programmed to carry out the control logic illustrated in FIGS. 3A-3C. As such, BSCM 49 and TCM 56 may each send regenerative braking torque limit signals to VSC 48 indicative of different vehicle capacities. VSC 48 may receive and arbitrate these torque limits and command M/G 18 to apply a regenerative braking torque according to one of the torque limits (for example and without limitation, according to the torque limit that is lesser in magnitude). One of ordinary skill in the art will understand, however, that the control logics discussed herein may be programmed into one or more than one controller in accordance with other embodiments. For example and without limitation, TCM 56 and VSC 48 may reside in the same control module.

Referring to FIG. 2A, speed curve 58 represents deceleration of the HEV 10 during blend-out, which may occur between $t_1$ and $t_2$. The starting speed 60 and ending speed 62 may be predefined and not vary among different use cases. Referring to FIG. 2B, BSCM blend-out curve 64 represents the decreasing regenerative braking torque limit that begins at $t_1$ with a starting torque 66 and ends at $t_2$ with an ending torque 68 of zero. In one embodiment, starting torque 66 may be a value in accordance with a vehicle stability limit, which represents a capacity of the vehicle to withstand a braking force of the driven wheels without losing lateral stability.

FIGS. 3A-3B are associated time plots of vehicle deceleration and regenerative braking blend-out characteristics coordinated with operation of the torque converter clutch 36 in accordance with another control logic. The control logic illustrated in FIGS. 3A-3B may be associated with the transmission regenerative blend-out limit during the blend-out duration. Blend-out in FIGS. 3A-3B occurs between $t_3$ and $t_4$, which may be the same as or different than $t_1$ and $t_2$ in FIGS. 2A-2B. FIG. 3A illustrates the state of the torque converter clutch during blend-out. The torque converter clutch 36 may be locked during blend-out and unlock at the end of blend-out (the unlocking of clutch 36 may define the end of blend-out). Referring to FIG. 3B, TCM blend-out curve 78 represents the decreasing regenerative braking torque limit that begins at $t_3$ with a starting torque 80 and ends at $t_4$ with an ending torque 82 of a nominal value (or zero in some embodiments). In one embodiment, starting torque 80 may be a value based on a regenerative torque limit of the powertrain 12, a brake request of the driver, and a lift pedal torque request (described in more detail below).

Figure 4:
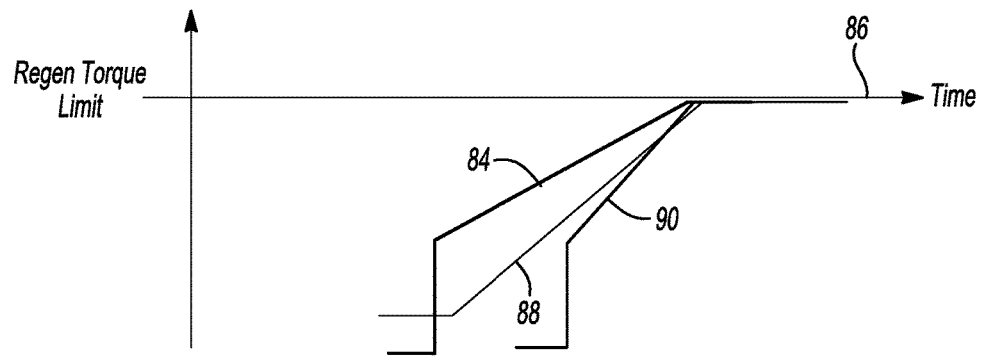
FIG. 4 is a time plot illustrating the regenerative braking blend-out torque limit curves of FIGS. 2B and 3B.

FIG. 4 is a time plot illustrating the regenerative braking blend-out torque limit curves. As discussed previously, in some HEVs, VSC 48 may receive the respective regen torque limit signals sent by subservient BSCM 49 and TCM 56 and arbitrate these blend-out "requests" (i.e., regen torque limit signals that decrease based on a shaft speed). As illustrated in FIG. 4, a transmission blend-out curve 84 representing the regen torque limit signals sent by TCM 56 during blend-out may fall between a time axis 86 and a brake blend-out curve 88 representing the regen torque limit signals sent by BSCM 49 during blend-out. Accordingly, the transmission regen torque limit signals sent by TCM 56 may be lesser in magnitude than the corresponding (i.e., at the same speed) brake regen torque limit signals sent by BSCM 49. As such, the transmission regen torque limits following the transmission blend-out curve 84 may win the blend-out arbitrations and, therefore, lead the blend-out. It may be desirable in some instances, however, to have the brake blend-out curve 88 lead the blend-out such that the friction brake fill-in torque will be based on the brake regen torque limits during blend-out. Having both friction brake torque and regen torque for blend-out calculated and commanded in one control module (e.g., brake control) may result in a smoother transition between regen and friction braking. Furthermore, under this strategy, there may be more regen braking and less friction braking. In addition, it may be desirable to have regen torque blend-out decrease according to a blend-out rate that is equal in magnitude to a desired or predicted friction brake fill-in rate (since friction brake torque may be determined as the total brake demand minus the regen braking torque), as will be discussed in more detail below.

In accordance with one embodiment, to ensure blend-out is led by curve 88, TCM 56 may send regen torque limit signals following a desired transmission regen torque limit curve 90, as shown in FIG. 4. As illustrated, the transmission regen torque limits following curve 90 may be more negative (greater in magnitude) than the brake regen torque limits of curve 88 during the blend-out period. Note that the blend-out duration associated with curves 88 and 90 may be the same or different within the spirit and scope of this disclosure Moreover, regen torque limit curves 88 and 90 decay to zero (or to a nominal value) at approximately the same time. This may be the case when the torque converter clutch unlock speed is about the same as the ending speed at which the brake regen torque limit equals zero. Such speeds may be approximately equal when the engine 14 is OFF.

Figure 5:
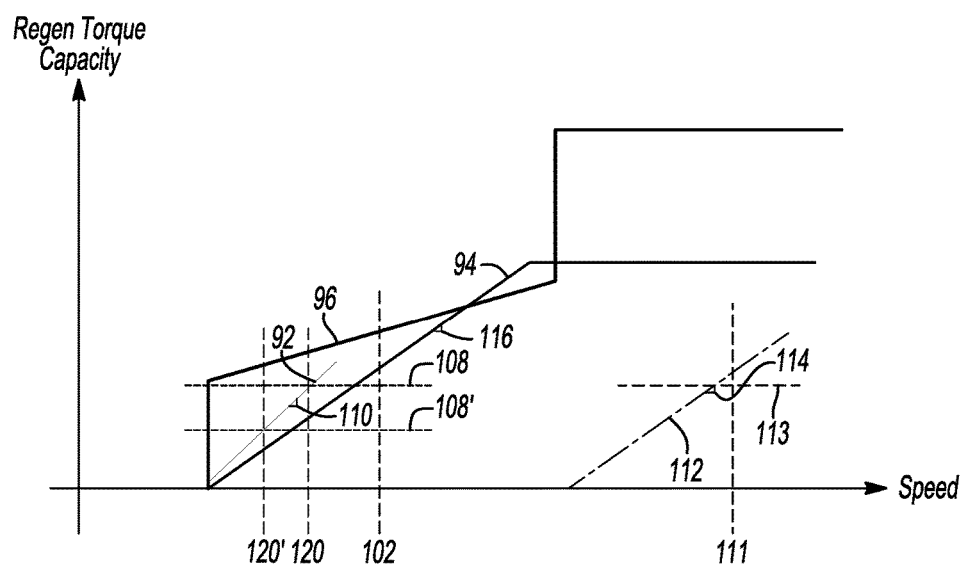
FIG. 5 is a speed plot illustrating regenerative braking blend-out torque limit curves in accordance with an embodiment of the present disclosure.

FIG. 5 is a speed plot illustrating regenerative braking blend-out torque limit curves in accordance with an embodiment of the present disclosure. The speed domain (which may represent vehicle speed, transmission output shaft speed, or the like) is used to avoid the impact of vehicle deceleration rate on the timing, and the regen torque limits are shown as positive to indicate capability. Referring to FIG. 5, in instances where the engine 14 is OFF, it may be desirable to design the transmission blend-out curve 92 such that it lies between the brake blend-out curve 94 and a torque converter clutch torque capacity boundary curve 96, which may indicate the maximum regen torque the torque converter clutch can support. In some embodiments, the torque converter clutch torque capacity boundary curve may be predetermined and/or set by the manufacturer. Furthermore, although the curves and regen torque limits disclosed herein may be referred to as "brake" or "transmission" curves and regen limits, one of ordinary skill in the art will understand that the curves and regen torque limits discussed herein may be associated with any controller(s) and that the nomenclature used herein is merely used to discuss two control logics. FIG. 5 will be referred to periodically during the discussion of FIG. 6 below.

Figure 6:
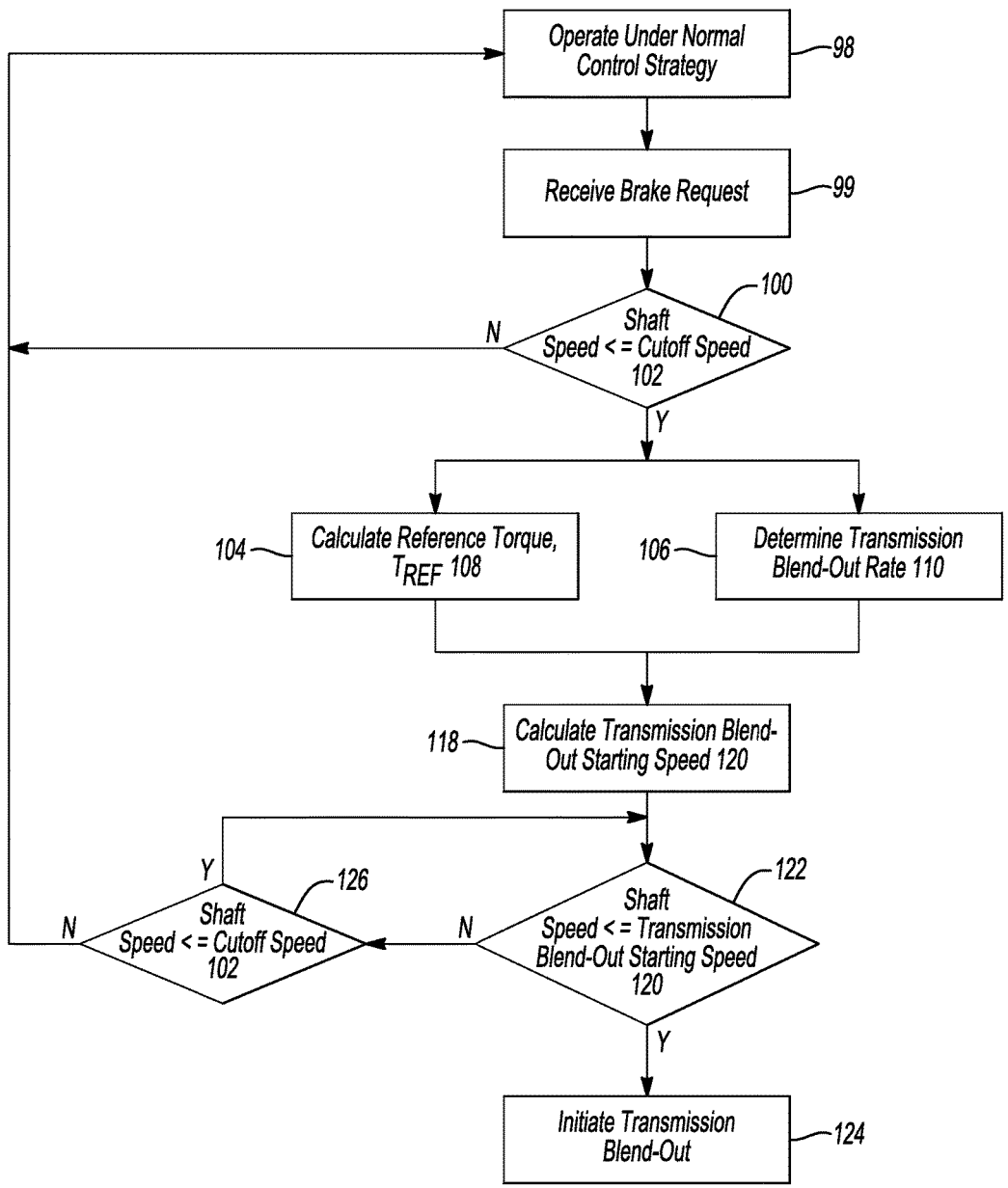
FIG. 6 is a flowchart corresponding to a method for controlling regenerative torque blend-out according to an embodiment of the present disclosure.

FIG. 6 is a flowchart corresponding to a method for controlling regenerative torque blend-out according to an embodiment of the present disclosure. In some embodiments, the method illustrated in FIG. 6 may be used to determine the blend-out starting speed and blend-out rate for use cases in which there is a scheduled unlocking of the torque converter clutch. The method may begin with the step 98 of operating under a normal control strategy, perhaps prior to blend-out and/or a brake request. The method may continue with the step 99 of receiving a brake request from the driver. The method may continue with the step 100 of determining whether a shaft speed associated with a speed of the vehicle 10 has reached a cutoff speed (i.e., a given shaft speed). The shaft speed may be based on a speed of HEV 10 or of transmission output shaft 38 (FIG. 1), or the like. One of ordinary skill in the art will understand that other speeds may be monitored. As HEV 10 decelerates and comes to a stop, the shaft speed may eventually reach the cutoff speed. FIG. 5 visually illustrates the cutoff speed as line 102 with respect to curve 92. In some embodiments, the cutoff speed 102 may vary and be based on a speed at which the torque converter clutch 36 is scheduled to unlock (torque converter clutch unlock speed) plus a calibratable value. The torque converter unlock schedule may be dynamic and vary according to transmission gear and engine state, for example. The calibratable value may also be transmission gear dependent and be calculated such that the cutoff speed is greater than the expected blend-out starting speed. In some embodiments, the calibratable value may be retrieved from a look-up table. If at step 100, the shaft speed is not less than or equal to the cutoff speed 102, then HEV 10 continues to operate under the normal control strategy under step 98. If at step 100, the shaft speed is less than or equal to the cutoff speed 102, the method may continue with the step 104 of calculating a reference torque and step 106 of determining a transmission blend-out rate. In the illustrated embodiment, steps 104 and 106 are performed in parallel. However, one of ordinary skill in the art will understand that steps 104 and 106 may be performed sequentially.

The reference torque in step 104 may be the torque at which the transmission blend-out starts (decreases from) and may be calculated in real-time using the following equation:

$$T_{ref} = (T_{LiftPedal} + \max(T_{BrakeRequest}, T_{RegenLim}))@\text{cutoff-Speed}$$

where $T_{ref}$ is the reference torque. $T_{LiftPedal}$ is the negative torque experienced by the transmission output shaft 38 (FIG. 1) when the accelerator pedal 50 is released. $T_{LiftPedal}$ may be provided by frictional forces occurring within engine 14 or by M/G 18 if engine 14 is disengaged from powertrain 12. $T_{BrakeRequest}$ is the torque requested by the driver, and $T_{RegenLimit}$ is the regen torque limit of powertrain 12, which may be based on a capacity of battery 20, of M/G 18, and/or the vehicle stability limit discussed above. As such, $T_{ref}$ may change with brake demand, a capacity(ies) of the powertrain 12, or a vehicle stability limit at the cutoff speed. Note that because $T_{BrakeRequest}$ and $T_{RegenLimit}$ are negative values (due to being regenerative braking torques), the above equation selects the maximum or less negative torque. $T_{ref}$ may be different for each regen braking event; therefore, $T_{ref}$ may be calculated at the moment the shaft speed reaches the cutoff speed (i.e., when the condition of step 100 is satisfied). FIG. 5 visually illustrates different reference torques as lines 108 and 108' with respect to curve 92. In one embodiment, TCM 56 may be programmed to reduce the regenerative torque limit from $T_{ref}$ to a nominal value or zero over the blend-out duration.

Referring to step 106, the transmission blend-out rate is the rate at which the regen torque limit is reduced to a nominal value or zero during the blend-out period and can vary for different use cases. As shown in FIG. 5, the transmission blend-out rate 110 is the slope of the transmission blend-out curve 92 during the blend-out period. Generally, the blend-out rate 110 may depend on the state of engine 14 (or on the scheduled unlock speed of the torque converter clutch 36), the brake torque demanded from the brake request, and/or the deceleration rate of HEV 10, as illustrated in the below equation (and will be explained below in connection with various use cases):

$$\text{Rate}_{TrnBlend-Out} = f(\text{Engine State}, \text{BrakeTorque}, \text{Decel Rate})$$

When the engine 14 is OFF and/or when an unlock speed at which the torque converter clutch is scheduled to unlock is less than or equal to a predefined value (for example and without limitation, 400 rpm), the transmission blend-out rate 110 may be selected according to the following equation:

$$|\text{Rate}_{TrnBlend-Out}| >= |\text{Rate}_{BrakeBlend-Out}|$$

As shown, the transmission blend-out rate 110 may be selected to be greater than or equal to the brake blend-out rate 116, which may be equivalent to a desired or predicted friction brake fill-in rate in some embodiments. In one embodiment, the desired or predicted friction brake fill-in rate may be 2000 Nm/sec. The brake regen torque limits following the brake blend-out curve 94 may be lesser in magnitude than the corresponding transmission regen torque limits following the transmission blend-out curve 92 during the blend-out and, therefore, may lead the blend-out. As such, the desired friction brake fill-in rate may be realized as VSC 48 commands M/G 18 to apply the maximum amount of negative regenerative torque and thus absorb the maximum amount of kinetic energy. This in turn may maximize regen braking, reduce wear on the friction brakes, and improve transmission-brake torque transition (which results in a smooth braking experience for the driver). The transmission blend-out rate 110 also may be selected such that the resulting transmission blend-out curve 92 is within the torque converter boundary curve 96 as shown in FIG. 5. In some embodiments, rate 110 may be selected from a look-up table (or the like).

When engine 14 is ON, the torque converter clutch 36 may unlock at a higher speed to prevent engine stall (e.g., impeller speed of 800 rpm versus 300 rpm when engine 14 is OFF). As such, the transmission regen torque limit curve may be shifted accordingly and have a greater cutoff speed 111 and different $T_{Ref}$ 113 (see shifted transmission blend-out curve 112 in FIG. 5). In these instances, blend-out may be led by the transmission blend-out curve 112 rather than the brake blend-out curve 94 because the torque converter clutch unlock speed (the speed at which the transmission blend-out may end) is higher than the brake blend-out ending speed. In one embodiment, M/G 18 may be configured and commanded by VSC 48 to apply a regenerative braking torque following the regenerative torque limit when an unlock speed at which the torque converter clutch is predicted or scheduled to unlock (i.e., the torque converter clutch unlock speed) exceeds a predefined value, such as 400 rpm. The torque converter clutch unlock speed may be greater than the predefined value when the engine is ON. When engine 14 is ON and/or when the torque converter clutch unlock speed is scheduled to be greater than the brake blend-out ending speed, the transmission blend-out rate 114 may be selected according to the following equation:

$$|Rate_{TrnBlend-Out}|=|Rate_{DesiredFrictonFill-In}|$$

As shown, the transmission blend-out rate 114 may be based on or equal to the desired friction brake fill-in rate.

In some embodiments, the selected blend-out rates 110, 114 may be adjusted to be based on the brake request to accommodate heavy braking and/or fast deceleration. When the driver applies a heavy brake (for example and without limitation, greater than 3,000 Nm), the starting speed of blend-out may be increased and the brake blend-out rate 116 may be decreased since it may take less time for the same vehicle speed to decrease (and to allow for a smooth transition from regen braking to friction braking). The transmission blend-out rate 110 or 114 may also be adjusted in the same manner such that the transmission blend-out starts earlier and decreases to a torque of zero over a wider speed range. Because the brake blend-out rate 116 may be adjusted to depend on the brake torque demand (and/or the vehicle deceleration rate), the corresponding adjustment to transmission blend-out rate 110 or 114 may easily be obtained as well.

Referring to FIG. 6, the method may continue with the step 118 of calculating the transmission blend-out starting speed 120 (shown visually in FIG. 5). Because $T_{ref}$ may be calculated in real-time (when shaft speed reaches the cutoff speed 102), the starting speed of the transmission blend-out may also be determined in real-time as the intersection of the $T_{ref}$ line with the transmission blend-out curve 92. For example, for a $T_{ref}$ value associated with line 108, the starting speed would be the value associated with line 120, and for a $T_{ref}$ associated with line 108', the starting speed would be the value associated with line 120'. The transmission blend-out rate 110 (discussed above), which is the slope of the transmission blend-out curve 92, may be defined by the following equation:

$$Rate_{TrnBlend-Out} = \frac{T_{TrnBlend-OutEnd} - T_{TrnBlend-OutStart}}{Spd_{TrnBlend-OutEnd} - Spd_{TrnBlend-OutStart}}$$

where $T_{TrnBlend-OutEnd}$ is the transmission regen torque limit at the end of blend-out, $T_{TrnBlend-OutStart}$ is the transmission regen torque limit at the start of blend-out, $Spd_{TrnBlend-OutEnd}$ is the shaft speed at the end of blend-out, and $Spd_{TrnBlend-OutStart}$ is the shaft speed at the start of blend-out (and may be defined by the transmission blend-out rate 110 as discussed below). To find the starting speed 120 at which to start the transmission blend-out, we solve the above equation for $Spd_{TrnBlend-OutStart}$, which may be determined in real-time when the shaft speed reaches the cutoff speed 102:

$$Spd_{TrnBlend-OutStart} = Spd_{TrnBlend-OutEnd} + \frac{T_{TrnBlend-OutStart} - T_{TrnBlend-OutEnd}}{Rate_{TrnBlend-Out}}$$

$T_{TrnBlend-OutStart}$ may be $T_{ref}$ 108 calculated in step 104 (FIG. 6). $T_{TrnBlend-OutEnd}$ may be equal to the torque capacity of the torque converter clutch 36 at unlock, which may be zero. Since transmission blend-out may end with the torque converter clutch 36 unlocking, $Spd_{TrnBlend-OutEnd}$ may be equal to the shaft speed at which the torque converter clutch 36 unlocks, which may be scheduled. As such, starting speed 120 may be based on a scheduled unlock speed of the torque converter clutch 36, blend-out rate 110, and $T_{ref}$ 108. Lastly, $Rate_{TrnBlend-Out}$ was determined in step 106.

In one embodiment, TCM 56 may be programmed to in response to a brake request and a shaft speed associated with a speed of the HEV 10 achieving a starting speed 120 that is defined by a torque of the powertrain, $T_{ref}$ 108, that changes with brake demand and a capacity of the powertrain or a vehicle stability limit at a given shaft speed (for example, the cutoff speed 102), reduce a regenerative torque limit that constrains a regenerative braking torque over a blend-out duration based on the shaft speed. In another embodiment, TCM 56 may be programmed to in response to a brake request, specify a regenerative torque limit based on the shaft speed over a blend-out duration that ends with the torque converter clutch 36 unlocking, such that a regenerative braking torque applied by M/G 18 following the regenerative torque limit decreases according to a blend-out rate 110 that is based on a desired friction brake fill-in rate. In yet another embodiment, TCM 56 may be programmed to in response to a brake request, reduce a regenerative torque limit associated with a torque capacity of the powertrain according to a blend-out rate 110 over a blend-out duration, the blend-out rate 110 being selected based on a predicted or scheduled unlock speed of the torque converter clutch 36 and a predicted friction brake fill-in rate at which a countervailing friction braking torque increases over the blend-out duration. Because the countervailing friction braking torque may be determined based on the applied regenerative braking torque (constrained by the regenerative torque limit), the predicted friction brake fill-in rate may be different than the actual friction brake fill-in rate. In some embodiments, the desired friction brake fill-in rate is equivalent to the predicted friction brake fill-in rate. One of ordinary skill in the art will understand that other controllers (e.g., BSCM 49, VSC 48) may be programmed with the disclosed control logics, separately or in combination with each other.

Referring to FIG. 6, the method may continue with the step 122 of determining whether the shaft speed has reached the calculated transmission blend-out starting speed 120. As discussed above, the shaft speed may be the speed of HEV 10 or of transmission output shaft 38, or any other speed that is associated with the speed of HEV 10. If at step 122, the shaft speed is less than or equal to the calculated transmission blend-out starting speed 120, the method may continue with the step 124 of initiating transmission blend-out. If at step 122, the shaft speed is not less than or equal to the calculated transmission blend-out starting speed 120, the method may continue with the step 126 of determining whether the shaft speed is still less than or equal to the cutoff speed 102 described above in connection with step 100. If at step 126, the shaft speed is less than or equal to the cutoff speed 102, the method may continue with the step 122 of determining whether the shaft speed has reached the calculated transmission blend-out starting speed 120. In the illustrated embodiment, the shaft speed is continually monitored until it reaches the calculated transmission blend-out starting speed 120. If at step 126, the shaft speed is not less than or equal to the cutoff speed 102, the method may continue with step 98 of operating under the normal control strategy. In the illustrated embodiment, if the driver accelerates sufficiently such that the shaft speed is greater than the cutoff speed 102 (i.e., such that the condition of step 126 is not satisfied), then the current braking event is presumed to have ended, and the HEV 10 may then operate under the normal control strategy until the next braking event occurs.

Once the condition of step 122 is satisfied, the method may continue with the step 124 of initiating transmission blend-out. In step 124, TCM 56 may send regen torque limit signals following the transmission blend-out curve 92, where the first blend-out signal may be $T_{Ref}$ calculated in step 104. The subsequent transmission regen torque limit signals may decrease in value according to the transmission blend-out rate 110 determined in step 106. In one embodiment, if TCM 56 sends transmission regen torque limit signals following curve 92 to VSC 48 (when engine 14 is OFF, for example), then VSC 48 may command M/G 18 to apply a regenerative braking torque according to brake blend-out curve 94 since the regen torque limits following curve 94 are lesser in magnitude than the corresponding (by speed) regen torque limits following curve 92. In another embodiment, if TCM 56 sends transmission regen torque limit signals following curve 112 to VSC 48 (when engine is ON for example), then VSC 48 may command M/G to apply a regenerative braking torque according to curve 112 since the regen torque limits following curve 112 are lesser in magnitude than the corresponding regen torque limits following curve 94.

Figure 7:
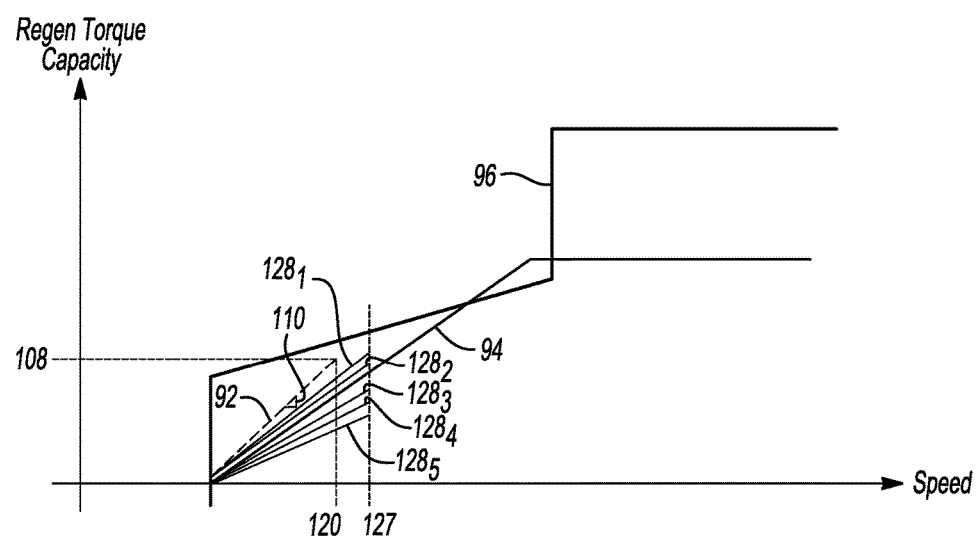
FIG. 7 is a speed plot illustrating various regenerative braking blend-out curves.

FIG. 7 is a speed plot illustrating various regenerative braking blend-out curves. As illustrated, if the transmission blend-out starting speed is defined as a constant speed represented as line 127 (the constant speed being, for example, the speed at which the torque converter clutch 36 is scheduled to unlock plus a constant or calibratable value), then the resulting blend-out curve $128_1$, $128_2$, $128_3$, $128_4$, or $128_5$ may be positioned above or below the brake blend-out curve 94. As described above, it may desirable to position the transmission blend-out curve 92 above the brake blend-out curve 94 as illustrated, such that the brake regen torque limits following the brake blend-out curve 94 are always lesser in magnitude than the corresponding (by speed) transmission regen torque limits following the transmission blend-out curve 92. By selecting the transmission blend-out rate 110 and calculating $T_{Ref}$ 108 and the starting speed 120 according to the above equations, the resulting blend-out curve 92 may be designed to fall above the brake blend-out curve 94 as illustrated.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain having a torque converter clutch; and
   at least one controller programmed to in response to a brake request, specify a regenerative torque limit based on a shaft speed over a blend-out duration that ends with the clutch unlocking such that a regenerative braking torque applied by a traction motor following the regenerative torque limit decreases according to a blend-out rate that is based on a desired friction brake fill-in rate.

2. The vehicle of claim 1, wherein the at least one controller is further configured to command a traction motor to apply the regenerative braking torque constrained by the regenerative torque limit over the blend-out duration.

3. The vehicle of claim 1, wherein the blend-out duration begins when the shaft speed reaches a starting speed that is based on the blend-out rate and a torque of the powertrain at a given shaft speed.

4. The vehicle of claim 3, wherein the torque of the powertrain changes with brake demand, a capacity of the powertrain, or a vehicle stability limit at a given shaft speed.

\* \* \* \* \*